United States Patent [19]

Hwang

[11] Patent Number: 5,734,415
[45] Date of Patent: Mar. 31, 1998

[54] SCREEN PROCESSING CIRCUIT AND METHOD OF VIDEO PHONE USING PICTURE-IN-PICTURE FUNCTION

[75] Inventor: Hyo-Hyeun Hwang, Suwon, Rep. of Korea

[73] Assignee: SamSung Electronics Co., Ltd., Suwon, Rep. of Korea

[21] Appl. No.: 586,623

[22] Filed: Dec. 22, 1995

[30] Foreign Application Priority Data

Dec. 24, 1994 [KR] Rep. of Korea ............ 36624/1994

[51] Int. Cl.$^6$ ............................................. H04M 11/00
[52] U.S. Cl. ............................................. 348/14
[58] Field of Search ................... 348/14–17; 379/96–99, 379/93, 93.17, 93.21, 96.26, 93.28, 93.37, 93.01

[56] References Cited

U.S. PATENT DOCUMENTS

| | | |
|---|---|---|
| 4,715,059 | 12/1987 | Cooper-Hart et al. |
| 5,073,926 | 12/1991 | Suzuki et al. ............ 348/17 |
| 5,315,391 | 5/1994 | Lee . |
| 5,400,068 | 3/1995 | Ishida et al. |
| 5,418,560 | 5/1995 | Yasuda . |
| 5,430,473 | 7/1995 | Beecher, II et al. |
| 5,477,546 | 12/1995 | Shibata et al. ............ 348/15 |

*Primary Examiner*—Wing F. Chan
*Attorney, Agent, or Firm*—Robert E. Bushnell, Esq.

[57] ABSTRACT

A screen processing circuit of a video phone including a camera and a monitor. The screen processing circuit comprises: a picture-in-picture key for selecting a transmitting-picture-oriented picture-in-picture mode and a picture-in-picture key for selecting a received-picture-oriented picture-in-picture mode; an encoder frame buffer for storing a video signal provided from the camera as transmitting-picture on screen data; a coder for compressing the video signal stored in the encoder frame buffer in order to transmit it to the receiving party; a decoder for recovering the compressed data being received from the receiving party; a decoder frame buffer for storing the recovered data as received-picture on screen data; and a picture-in-picture controller which senses an input from one of the picture-in-picture keys and for selecting either one of a transmitting-picture-oriented picture-in-picture mode and a received-picture-oriented picture-in-picture mode, and reduces the corresponding picture data by a frame unit according to the selected mode to thereby combine the reduced data with the rest picture data and outputs the combined data on the picture of the monitor, thereby controlling the transmitting-picture on screen and the received-picture on screen to be simultaneously outputted in a form of picture-in-picture screen.

13 Claims, 3 Drawing Sheets

SCREEN PROCESSING CIRCUIT AND METHOD OF VIDEO PHONE USING PICTURE-IN-PICTURE FUNCTION

CROSS REFERENCE TO RELATED APPLICATIONS

This application makes reference to, incorporates the same herein, and claims all benefits accruing under 35 U.S.C. §119 from an application entitled Screen Processing Circuit And Method Of Video Phone Using Picture In Picture Function earlier filed in the Korean Industrial Property Office on 24 Dec. 1994, which was duly assigned Ser. No. 36624/1994 by that Office.

BACKGROUND OF THE INVENTION

The present invention relates to a screen processing circuit and method in a video phone, and particularly to a circuit and method for displaying images on a screen by using a picture-in-picture function (PIP).

The video phone is a communication terminal equipment simultaneously executing an audio communication and a video communication through a telephone line. When it is desired to check a transmission state of a transmitting party's, i.e., caller, picture during communication, in the conventional video phone, a receiving party's, i.e., the called party, picture received from the caller's video phone is removed from the caller's screen, and the caller's picture, input from a camera, is displayed on the caller's screen. Therefore, when changing to a transmitting-picture on screen mode, it is impossible to observe a counterpart's picture, that is, a caller's picture. Accordingly, there is a disadvantage in frequently changing between a transmitting-picture on screen display mode and a received-picture on screen display mode.

SUMMARY OF THE INVENTION

Accordingly, it is an object of the present invention to provide an improved circuit and process for a picture telephone.

It is another object to provide a circuit and method displaying a transmitting-picture on screen as a subscreen picture on a receiving-picture on screen by using picture-in-picture function, in order to observe the receiving party's picture as well as the transmitting party's picture during communication.

It is another object to provide a circuit and method displaying a receiving-picture on screen as a subscreen picture on a transmitting-picture on screen by using picture-in-picture function, in order to observe the transmitting party's picture as well as the receiving party's picture during communication.

To achieve these and other objects, a screen processing circuit of a video phone constructed according to the principles of the present invention with a camera and a monitor, uses: a picture-in-picture key for selecting a transmitting-picture-oriented picture-in-picture mode and a picture-in-picture key for selecting a received-picture-oriented picture-in-picture mode. An encoder frame buffer stores a video signal provided from the camera as transmitting-picture on screen data; a coder compresses the video signal stored in the encoder frame buffer in order to transmit it to the receiving party, and a decoder recovers the compressed data being received from the receiving party while a decoder frame buffer stores the recovered data as received-picture on screen data. A picture-in-picture controller which senses an input from one of the picture-in-picture keys and selects either one of a transmitting-picture-oriented picture-in-picture mode and a received-picture-oriented picture-in-picture mode, and reduces the corresponding picture data by a frame unit in accordance with the selected mode in order to combine the reduced data with the rest picture data and outputs the combined data on the picture of the monitor, and to thereby controlling the transmitting-picture on screen and the received-picture on screen to be simultaneously outputted in a form of picture-in-picture screen.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE PREFERRED EMBODIMENT

In the following description, numerous specific details, such as a name of a specific key and so on, are set forth in order to provide a thorough understanding of the present invention. It will be understood by those skilled in the art that other embodiments of the present invention may be practiced without these specific details, or with alternative specific details. Further, a detailed explanation of the function and structure capable of obscuring subject matter of the present invention will not be described.

In an embodiment of the present invention, the transmitting-picture and the received-picture are simultaneously displayed on a screen by using the picture-in-picture function. A picture-in-picture function is generally used in the television broadcasting, and a detailed explanation and the applications of the picture-in-picture function is described in U.S. Pat. No. 5,315,391 to Jun H. Lee entitled PIP Main And Subscreen Selection From Among TV, BS, and VCR Playback Signals, incorporated herein by reference.

Figure 1:
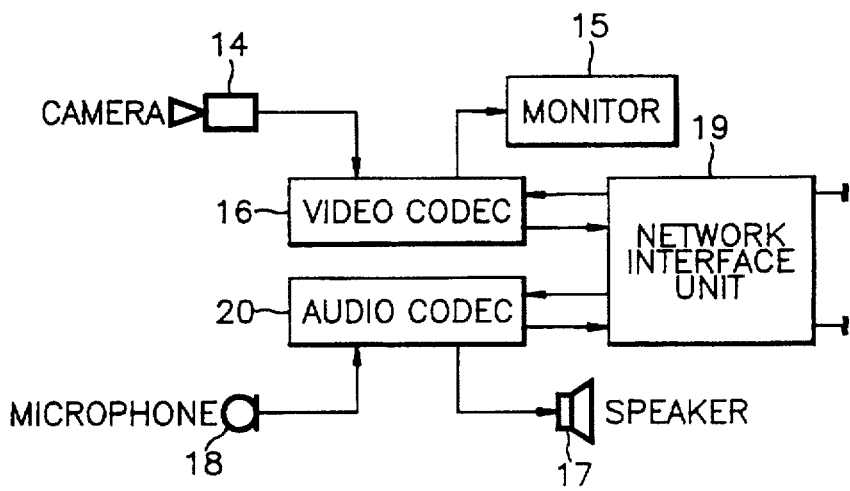
FIG. 1 is a block diagram illustrating the structure of a video phone according to the principles of the present invention.

FIG. 1 is a block diagram shows the structure of the video phone according to the principles of the present invention. The video phone comprises a camera 14, a video CODEC 16, a monitor 15, a microphone 18, an audio CODEC 20, a speaker 17, and a network interface unit 19. Camera 14 generates a color image including a transmitting party's picture. Video CODEC 16 has a video compression unit which converts an analog image output from camera 14 into a digital form and compresses the converted image to be suitable for a known standard H 261, and a recovering unit which recovers video data received in the compressed state from the receiving party's video phone. Monitor 15 displays the recovered video data for a user. Microphone 18 inputs the transmitting party's audio data. Audio CODEC 20 compresses the audio data input from microphone 18 and recovers the audio data received from the receiving party's video phone. Speaker 17 amplifies and outputs the recovered audio data for the transmitting party to hear. Network interface unit 19 is connected to video CODEC 16 and audio CODEC 20, and multiplexes or demultiplexes video and audio data being transmitted and/or received.

Figure 2:
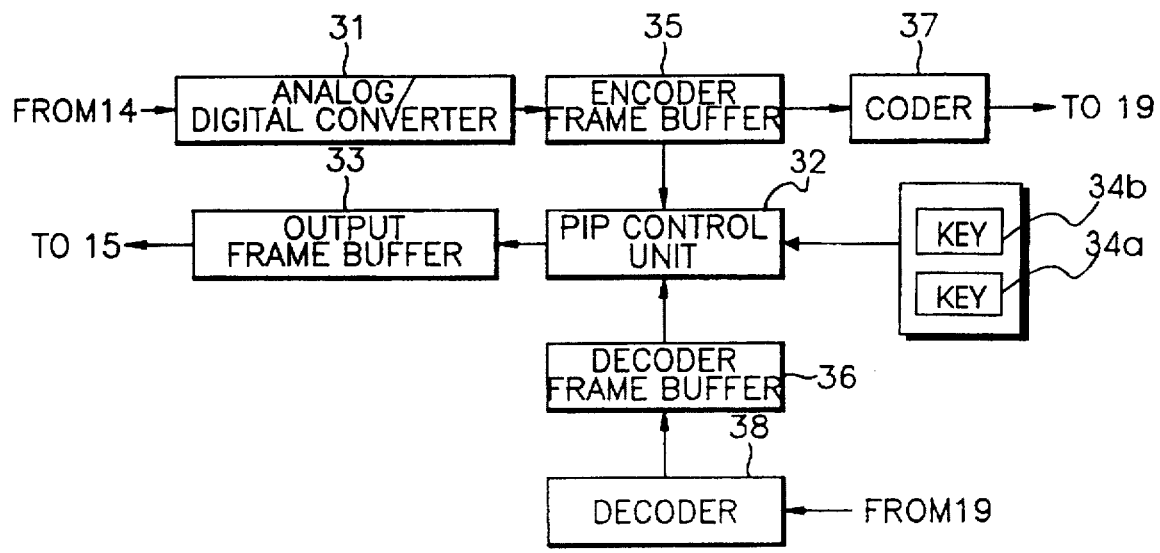
FIG. 2 is a block diagram illustrating the structure of a video CODEC unit of the video phone of FIG. 1 and constructed according to the principles of the present invention.

Video CODEC 16 is constructed as shown in FIG. 2 in order to perform the picture-in-picture function by combining an image which is recovered in the recovering unit and an image which is input from camera 14.

In FIG. 2, the picture processing operations, except for the picture-in-picture function, are performed as follows. A signal input from camera 14 is stored in encoder frame buffer 35 through analog-to-digital converter 31. The stored data is compressed by coder 37 for transmission to the receiving party's video phone through network interface unit 19. Contrarily, compressed data received through network interface unit 19 is recovered in decoder 38 to be stored in decoder frame buffer 36, and data which has been stored in this manner is displayed on monitor 15 through a digital-to-analog converter (not shown).

In order to add the picture-in-picture function in the picture processing operations performed in the above procedure, picture-in-picture control unit 32 is connected to output terminals of encoder frame buffer 35 and decoder frame buffer 36. Picture-in-picture keys 34a and 34b are connected to picture-in-picture control unit 32 for selecting whether the picture-in-picture processing function is one for a transmitting-picture-oriented picture-in-picture mode or a received-picture-oriented picture-in-picture mode, respectively.

When displaying the transmitting-picture as the subscreen picture and the received-picture as the main screen picture, picture-in-picture control unit 32 reduces the data of encoder frame buffer 35, the reduced data is combined with the data of decoder frame buffer 36, and the combined data is transmitted to output frame buffer 33, thus displaying a picture-in-picture image on monitor 15.

On the other hand, for displaying the received-picture as the subscreen picture and the transmitting-picture as the main screen picture, picture-in-picture control unit 32 reduces the data of decoder frame buffer 36, combines the reduced data with the data of encoder frame buffer 35, and the combined data is transmitted to output frame buffer 33, thus enabling display of a different picture-in-picture image on monitor 15.

Figure 3:
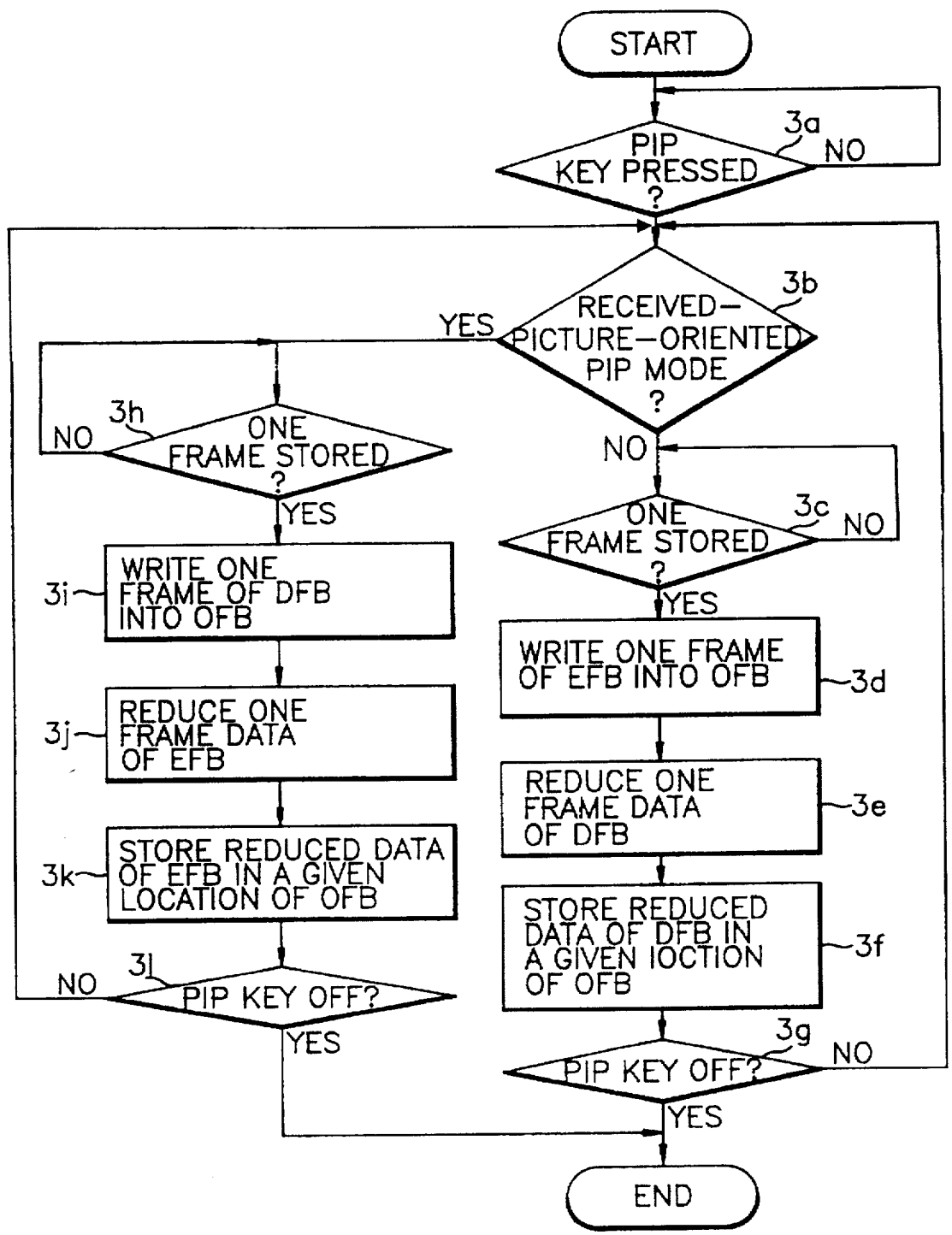
FIG. 3 is a flow chart illustrating a picture-in-picture processing operation of the video phone according to the principles of the present invention.

FIG. 3 is a flow chart illustrating the picture-in-picture processing operation performed in accordance with the present invention, and the detailed explanation of the each processing operation will be given as follows.

When an input of one of the picture-in-picture keys is sensed a check is made regarding whether the input picture-in-picture key is for the transmitting-picture-oriented picture-in-picture mode or the received-picture-oriented picture-in-picture mode, steps 3a and 3b. As a result of checking step 3b, when it is determined that the received-picture-oriented picture-in-picture mode has been selected, decoder frame buffer 36 is checked in step 3h to determine whether one frame of data has been stored. When at least one frame of data is determined to have been stored in decoder frame buffer 36, one frame of stored data in decoder frame buffer 36 is read out and stored in a given location, i.e., a main screen picture storing region, of output frame buffer 33, and one frame of video data provided from camera 14 is stored in encoder frame buffer 35, step 3i. Then the one frame of video data stored in encoder frame buffer 35 is reduced, step 3j, and stored in a given location, i.e., a subscreen picture storing region, of output frame buffer 33.

Then it is determined in step 3l whether or not the picture-in-picture key is in an OFF state. When the result of step 3l indicates that the OFF state is not sensed, step 3b of checking whether or not the input picture-in-picture key is the received-picture-oriented picture-in-picture mode is checked again, thereby repeating the operations described above. When step 3l indicates that the picture-inpicture key is in the OFF state the picture-in-picture operation is ended and step 3a is then repeated.

When step 3b indicates the input picture-in-picture key is for the transmitting-picture-oriented picture-in-picture mode, it is checked to determine whether at least one frame of data input from camera 14 is stored in encoder frame buffer 35. When at least one frame of data is determined to have been stored in encoder frame buffer 35, one frame of stored data in encoder frame buffer 35 is read out and stored in a given location, i.e., a main screen picture storing region, of output frame buffer 33, and one frame of video data provided from network interface unit 19 is stored in decoder frame buffer 36, step 3d. Then the one frame of video data stored in decoder frame buffer 36 is reduced, step 3e, and stored in a given location, i.e., a subscreen picture storing region, of output frame buffer 33, step 3f.

Then it is determined whether or not the picture-in-picture key is in an OFF state, step 3g. When the result of step 3g indicates that the OFF state is not sensed, step 3b of checking whether or not the input picture-in-picture key is the received-picture-oriented picture-in-picture mode is checked again, thereby repeating the operations described above. When step 3g indicates that the picture-inpicture key is in the OFF state the picture-in-picture operation is ended and step 3a is then repeated.

Although not shown in FIG. 3, it should be understood that only the received-picture is displayed on screen 15 as the main screen data until a picture-in-picture key is sensed, step 3a. Additionally, it should be understood that once the data is stored in output frame buffer 33, steps 3f and 3k, this data is then displayed on monitor 15. Further, it should be understood that the picture-in-picture control unit reduces data by compression and that the reduced data, for subscreen display, is provided to output frame buffer 33 and overwrites a portion of the frame of data already stored in output frame buffer 33 at a desired location to thereby provide combined data of the main screen and the subscreen for display.

Figure 4B:
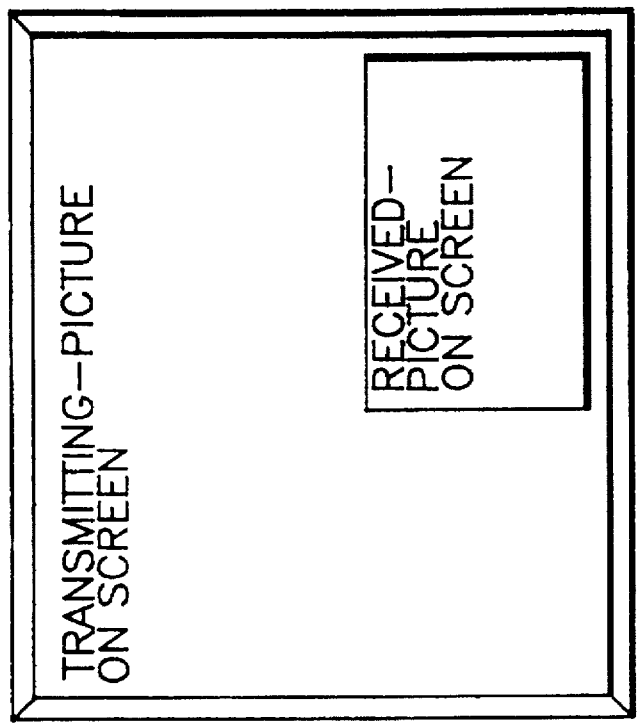
FIGS. 4A and 4B show the picture-in-picture screen of the video phone according to the principles of the present invention.
Figure 4A:
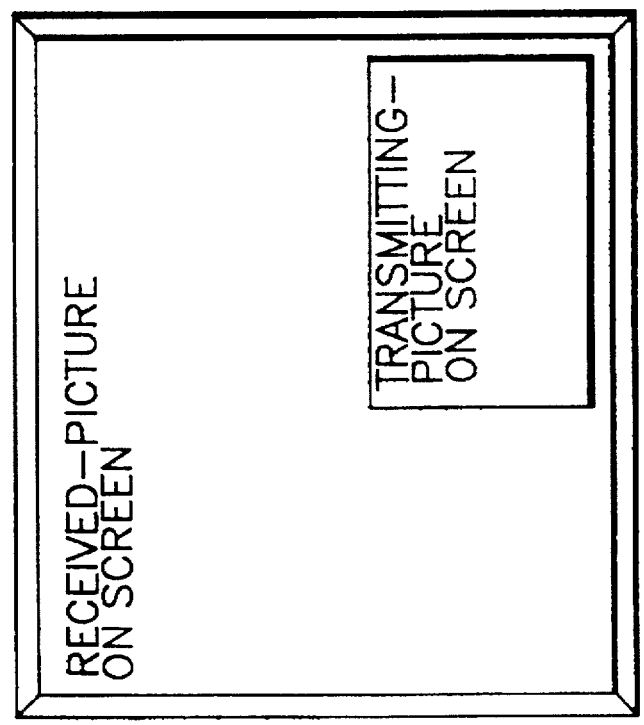

FIGS. 4A and 4B show the picture-in-picture screen of the video phone in accordance with the present invention. FIG. 4A shows the state that the received-picture-oriented picture-in-picture mode is selected, thereby displaying the received-picture on screen as the main screen picture and the transmitting-picture on screen as the subscreen picture. FIG. 4B shows the state that the transmitting-picture-oriented picture-in-picture mode is selected, thereby displaying the transmitting-picture on screen as the main screen picture and the received-picture on screen as the subscreen picture.

While the present invention has been described with reference to a few specific embodiments, the description is illustrative of the invention and is not to be constructed as limiting the invention. Various modifications may occur to those skilled in the art without departing from the true spirit and scope of the invention as defined by the appended claims.

What is claimed is:

1. An apparatus for picture-in-picture display on a monitor of a video phone having a camera, said apparatus comprising:

means for digitizing and storing a transmitting picture received from said camera;

means for decoding and storing a received picture;

mode selecting means for selecting one of a transmitting-picture-oriented picture-in-picture mode and a received-picture-oriented picture-in-picture mode;

picture-in-picture control means for reading out the stored transmitting picture and the stored received picture, for compressing one of said read out transmitting and received pictures in response to the one of said transmitting-picture-oriented picture-in-picture and a received-picture-oriented picture-in-picture modes selected by said mode selecting means; and an output frame buffer, connected to said monitor, for storing one of said transmitting and received pictures, read out by said picture-in-picture control means, as main screen display data in a first storage area and for storing the one of said transmitting and received pictures compressed by said picture-in-picture control means as subscreen display data in a second storage area.

2. The apparatus as set forth in claim 1, said means for digitizing and storing a transmitting picture received from said camera comprising an analog-to-digital converter connected to said camera and an encoder frame buffer.

3. The apparatus as set forth in claim 1, said means for decoding and storing a received picture comprising a decoder for decompressing said received picture and a decoder frame buffer.

4. The apparatus as set forth in claim 1, said mode selecting means comprising a first picture-in-picture key selecting said transmitting-picture-oriented picture-in-picture mode and a second picture-in-picture key for selecting said received-picture-oriented picture-in-picture mode.

5. The apparatus as set forth in claim 4, wherein said picture-in-picture control means detects activation of one of said first and second picture-in-picture keys and determines whether the activated one of said first and second picture-in-picture keys is for one of said transmitting-picture-oriented picture-in-picture and a received-picture-oriented picture-in-picture modes.

6. The apparatus as set forth in claim 5, wherein said picture-in-picture control means determines whether said means for digitizing and storing a transmitting picture has at least one frame of data stored therein when the activated one of said first and second picture-in-picture keys is for one of said transmitting-picture-oriented picture-in-picture mode, and controls transfer of said at least one frame of data to said first storage area when said means for digitizing and storing a transmitting picture has at least one frame of data stored therein.

7. The apparatus as set forth in claim 6, wherein said picture-in-picture control means reads out and compresses a frame of data stored in said means for decoding and storing a received picture, when said at least one frame of data is transferred from said means for digitizing and storing a transmitting picture to said first storage area, to output a frame of compressed data, and for storing said frame of compressed data into said second storage area.

8. The apparatus as set forth in claim 5, wherein said picture-in-picture control means determines whether said means for decoding and storing a received picture has at least one frame of data stored therein when the activated one of said first and second picture-in-picture keys is for one of said received-picture-oriented picture-in-picture mode, and controls transfer of said at least one frame of data to said first storage area when said means for decoding and storing a received picture has at least one frame of data stored therein.

9. The apparatus as set forth in claim 8, wherein said picture-in-picture control means reads out and compresses a frame of data stored in said means for digitizing and storing a transmitting picture, when said at least one frame of data is transferred from said means for decoding and storing a received picture to said first storage area, to output a frame of compressed data, and for storing said frame of compressed data into said second storage area.

10. A method for controlling picture-in-picture display in a video telephone, said method comprising the steps of:

detecting an input from a picture-in-picture key;

determining whether said input is indicative of selection of one of a transmitting-picture-oriented picture-in-picture mode and a received-picture-oriented picture-in-picture mode;

detecting when an encoder frame buffer has at least one frame of data indicative of a transmitting picture stored therein when it is determined that said input is indicative of said transmitting-picture-oriented picture-in-picture mode;

transferring said at least one frame of data into a main screen storage area of an output frame buffer;

detecting and compressing a frame of data indicative of a received picture to produce a compressed frame of data; and storing said compressed frame of data into a subscreen storage area of said output frame buffer.

11. The method as set forth in claim 10, further comprising the steps of:

detecting when a decoder frame buffer has at least one frame of data indicative of said received picture stored therein when it is determined that said input is indicative of said received-picture-oriented picture-in-picture mode;

transferring said at least one frame of data indicative of said received picture into said main screen storage area of said output frame buffer;

detecting and compressing a frame of data indicative of said transmitting picture to produce a reduced frame of data; and storing said reduced frame of data into said subscreen storage area of said output frame buffer.

12. The method as set forth in claim 11, further comprising the steps of:

combining the data of said main screen storage area and the reduced frame of data of said subscreen storage data to provide combined data for display; and displaying said combined data as a received-picture-oriented picture-in-picture.

13. The method as set forth in claim 10, further comprising the steps of:

combining the data of said main screen storage area and the compressed frame of data of said subscreen storage data to provide combined data for display; and displaying said combined data as a transmitting-picture-oriented picture-in-picture.

* * * * *